United States Patent
Lee et al.

(10) Patent No.: US 9,292,441 B2
(45) Date of Patent: Mar. 22, 2016

(54) CACHE SYNCHRONIZATION SYSTEM, CACHE SYNCHRONIZATION METHOD AND APPARATUS THEREOF

(71) Applicant: SK Telecom Co., Ltd., Seoul (KR)

(72) Inventors: Jong Min Lee, Seongnam-si (KR); Kyung Jun Lee, Seongnam-si (KR); Young Jae Shim, Seoul (KR); Sung Ho Shin, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 286 days.

(21) Appl. No.: 13/850,648

(22) Filed: Mar. 26, 2013

(65) Prior Publication Data

US 2013/0262766 A1    Oct. 3, 2013

(30) Foreign Application Priority Data

Mar. 27, 2012  (KR) .................. 10-2012-0030986

(51) Int. Cl.
*G06F 12/08*  (2006.01)
*H04L 29/08*  (2006.01)

(52) U.S. Cl.
CPC ............ *G06F 12/0806* (2013.01); *H04L 67/18* (2013.01); *H04L 67/2842* (2013.01)

(58) Field of Classification Search
CPC .. G06F 12/0806; H04L 67/18; H04L 67/2842
See application file for complete search history.

(56) References Cited

U.S. PATENT DOCUMENTS

2005/0147130 A1*  7/2005  Hurwitz et al. ............... 370/503

FOREIGN PATENT DOCUMENTS

KR    1020100058348 A    6/2010
KR    1020110044611 A    4/2011

OTHER PUBLICATIONS

Korean Office Action for corresponding Korean Application No. 10-2012-0030986 dated Dec. 11, 2015, citing the above reference(s).

* cited by examiner

*Primary Examiner* — Yong Choe
(74) *Attorney, Agent, or Firm* — Hauptman Ham, LLP

(57) ABSTRACT

Disclosed are a cache synchronization system, a cache synchronization method and a local cache to perform synchronization. The local cache is configured to determine whether to perform synchronization for specific content on the basis of synchronization policy information, if it is determined that synchronization is to be performed, to set a dispersion parameter that defines a synchronization range for the specific content according to the synchronization policy information, and to transmit synchronization information about the specific content, which includes the dispersion parameter, to at least one neighboring local cache.

16 Claims, 4 Drawing Sheets

CACHE SYNCHRONIZATION SYSTEM, CACHE SYNCHRONIZATION METHOD AND APPARATUS THEREOF

CROSS-REFERENCE TO RELATED APPLICATION

The present application is based on, and claims priority from, KR Application Serial Number 10-2012-0030986, filed on Mar. 27, 2012. The disclosure of the above-listed application is hereby incorporated by reference herein in their entirety.

TECHNICAL FIELD

The present disclosure relates to a cache synchronization system, a cache synchronization method, a cache controller and a local cache for synchronization.

BACKGROUND

Description in this section provides background information of at least one embodiment of the present disclosure and does not constitute a prior art. With the advent of smartphones, a user can download various types of content such as web content, video, audio, images, applications, etc. using a mobile terminal. Modern people increasingly use content through a wireless network rather than a wired network. When content is downloaded using a wireless network, one consideration is downlink speed with securing requisite Quality of Service (QoS). Another consideration is seamless transmission of content during a handover that occurs when a user moves in a wireless network.

The inventors have noted that a cache synchronization system is capable of efficiently transmitting some content with requisite quality of Service (QoS).

SUMMARY

In accordance with some embodiments, the local cache comprises a content storage unit, a cache position manager and a synchronization unit. The content storage unit is configured to store at least a part of at least one content. The cache position manager is configured to manage position information of one or more local caches. The synchronization unit is configured to set a synchronization range for the at least one content, and to perform synchronization of the at least one content such that the at least one content is made available at another local cache located in the set synchronization range on the basis of the position information of the one or more local caches. The local cache further comprises a synchronization policy manager configured to manage synchronization policy information used as a reference by which the synchronization range is set, wherein the synchronization unit is configured to set the synchronization range on the basis of the synchronization policy information and the position information.

In accordance with some embodiments, the cache controller is configured to control one or more local caches dispersed in different areas. The cache controller comprises a synchronization policy provider and a cache position manager. The synchronization policy provider is configured to set synchronization policy information that becomes a reference by which a synchronization range for specific content is set in of the one or more local caches, and to provide the set synchronization policy information to the one or more local caches. And the cache position manager is configured to manage position information of the one or more local caches, and to provide the position information of the one or more local caches to the one or more local caches for synchronization among the one or more local caches.

In a cache synchronization method performed by a local cache among other local caches to provide at least one content to one or more user terminals, the local cache is configured to determine whether to perform synchronization for specific content on the basis of synchronization policy information, if it is determined that synchronization is performed, to set a dispersion parameter that defines a synchronization range for the specific content according to the synchronization policy information, and to transmit synchronization information about the specific content, which includes the dispersion parameter, to a neighboring local cache.

In a cache synchronization method performed by a local cache among other local caches to provide content to at least user terminal, the local cache receives synchronization information about specific content, which includes a dispersion parameter that defines a synchronization range, from another local cache, stores the received synchronization information such that the specific content is provided to the at least one user terminal, reduces the value of the dispersion parameter by a predetermined unit value, comparing the value of the reduced dispersion parameter with a first reference value, determines whether synchronization is performed according to the comparison result, and transmits synchronization information including the reduced dispersion parameter to a neighboring local cache.

DETAILED DESCRIPTION

Exemplary embodiments of the present disclosure will now be described more fully with reference to the accompanying drawings. This disclosure may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this disclosure may be employed in varied and numerous embodiments without departing from the scope of the embodiments of this disclosure.

Unless otherwise defined, all terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The foregoing description of illustrated embodiments of the present disclosure, including what is described in the abstract, is not intended to be exhaustive or to limit the disclosure to the precise forms disclosed herein. For example, "content" used herein can refer to, software, computer program, digitalized data, or information such a digital format as one or more text (e.g., SMS, MMS and so on), voice, one or more photos, one or more videos, one or more sounds or music, and any format of digital rights. And "synchronization" can be used in communication, telecommunication, network and so on. And "synchronization" can refer to procedure or communications for making available at least a part of content between or among network entities, such as local caches for handover due to one or more user terminals moving from one cell to another cell in a mobile communications network. While specific embodiments of, and examples for, the disclosure are described herein for illustrative purposes only, various equivalent modifications are possible within the spirit and scope of the present disclosure, as those skilled in the relevant art will recognize and appreciate. As indicated, these modifications may be made to the present disclosure in light of the foregoing description of illustrated embodiments of the present invention and are to be included within the spirit and scope of the present disclosure.

Figure 1:
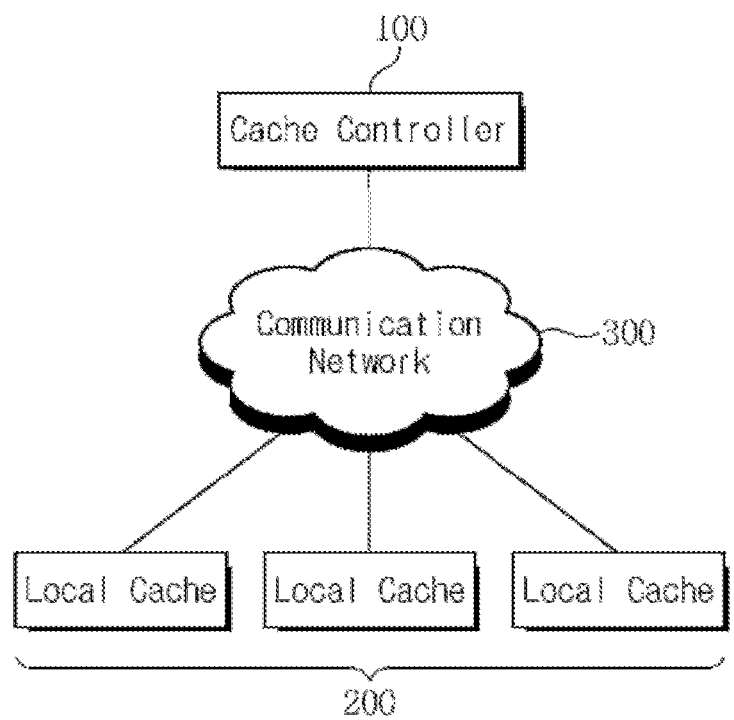
FIG. 1 a block diagram of a cache synchronization system in accordance with at least one embodiment.

FIG. 1 a block diagram of a cache synchronization system in accordance with at least one embodiment.

Referring to FIG. 1, the cache synchronization system is configured to include a cache controller 100 connected through a communication network and a plurality of local caches 200.

The cache controller 100 is configured to control and manage the plurality of (or one or more) local caches 200. Particularly, the cache controller 100 is configured to set synchronization policy information related to synchronization policy among the local caches 200 and to provide the synchronization policy information to the local caches 200. The cache controller 100 is configured to set the synchronization policy information in such a manner that a synchronization range is designated on the basis of the synchronization policy information. The cache controller 100 can be configured to set the synchronization policy information so as to define the synchronization range on the basis of at least one of the following factors (or criteria): for example, (1) the preference value; (2) size and type of content to be synchronized; (3) the occurrence frequency of a handover during provision of content from the local caches; (4) a direction in which handover is generated; and (5) whether synchronization is forcedly set by a specific local cache(s) among the local caches.

The cache controller 100 is configured to manage position information of the plurality of local caches 200, through which each of the local caches 200 check positions (or locations) of neighboring other local caches around itself for synchronization, and to provide information (i.e., so-called position information) about the positions of the neighboring other local caches to each of the local caches 200. In one or more embodiments, the cache controller includes one or more computer systems as described herein.

Each of local caches 200 is disposed (or arranged or distributed) to communicate with the cache controller through the communication network 300 and to provide content cached therein to at least one user terminal (not shown). The local caches 200 can be configured to provide a content transmission service to at least one user terminal connected to either or both a wireless network or/and a wired network. All or some of local caches 200 can be designed so as to dispose in different regions of the communication network 300 and to provide content to one or more user terminals located in the different regions. For example, when some content is provided to a user terminal connected to a wired network, the local caches 200 can be configured to be installed in an internet service provider (ISP) or a data center. In a case where content is provided to a user terminal, such as a smartphone, connected to a wireless network, the local caches 200 can be located for each wireless access network implemented by a base station or an access point such as Wi-Fi access point (AP). In this case, the local caches 200 can be configured to be arranged (or disposed) at a wireless network or a wired network located closer to one or more user terminals to rapidly provide some content to the user terminals.

The plurality of local caches 200 can communicate with each other through the communication network 300 as necessary. Furthermore, the local caches 200 are configured to be local caches in a content delivery network (CDN) or local caches implemented in a general cache scheme. The local caches 200 can be configured to adopt at least one of forward, reverse and transparent schemes. The plurality of local caches 200 can be also configured to adopt different schemes as necessary.

Particularly, each of the local caches 200 is configured to store all or some of content to be provided to one or more user terminals. Each of the local caches 200 also set a synchronization range for the stored some or all content, and perform synchronization related to the stored some or all content along with at least one of other local caches located in (or resided in) the set synchronization range such that the at least one of the other local caches on behalf of a certain local cache, which initially has provided some or all content before performing handover thereto, can continually provide the stored some or all content to the one or more user terminals. In synchronization, each of local caches 200 is configured to receive the synchronization policy information set by the cache controller 100, store the synchronization policy information and perform synchronization on the basis of the synchronization policy information The communication network 300 refers to a network capable of transmitting/receiving data, for example through the internet protocol using various wired/wireless communication technologies, such as the internet, intranet, a mobile communication network, a satellite communication network, etc. The communication network 300 may include a cloud computing network that is connected to the cache controller 100 or one or more the local caches 200, stores computing resources such as hardware, software, etc. and provides computing resources that a client desires to a terminal corresponding to the client. Cloud computing refers to a computer environment in which information is stored in a server on the Internet and temporarily stored in a client terminal such as a desktop computer, a tablet computer, a notebook computer, a netbook computer, a smart phone or the like. The client computing network refers to a computer environment access network in which information about a user is stored in a server on the Internet and the stored information can be used through various IT devices anytime and anywhere. The communication network 300 includes not only a closed network such as local area network (LAN), wide area network (WAN) and an open network such as the Internet but also networks such as code division multiple access (CDMA), wideband code division multiple access (WCDMA), global system for mobile communications (GSM), long term evolution (LTE) and evolved packet core (EPC) networks, next-generation networks and cloud computing networks.

A description will be hereinafter given of a cache synchronization performed by a cache synchronization system according to the present disclosure.

In the present disclosure, synchronization policy information may refer to both or either of information and operation relating to synchronization performed between or among the plurality of local caches 200. The cache synchronization described below, performed by a cache synchronization system, can be included in the concept of a cache synchronization policy. The synchronization policy information may include first synchronization policy information relating to synchronization with a second local cache in a event where specific content is cached in a first local cache adjacent to the second local cache, and second synchronization information relating to synchronization with a third local cache which is performed by the first local cache on or after the first local cache has synchronized with the second local cache. In the following description, another synchronization performed on the third local cache by the first local cache on or after the first local cache has completed synchronization with the second local cache is defined as synchronization propagation.

The cache synchronization, performed by a cache synchronization system in accordance with the present disclosure, may include an embodiment (hereinafter referred to as first method for convenience) that synchronizes all or some of corresponding content as well as another embodiment (hereinafter referred to as second method for convenience) that synchronizes content information data (e.g. information about a position at which all or some of corresponding content are stored). An operator can use both embodiments together, as well as either of them selectively.

Specifically, in the first method (i.e., the embodiment that synchronizes all or some of corresponding content), a local cache located in an area (or cell) to which a user terminal has moved from a previous camped-on area (or cell) can directly provide all or some of corresponding content to the user terminal by using synchronized content. On the other hand, in the second method (i.e., another embodiment that synchronizes content information data), a local cache located in an area to which a user terminal has moved from a previous camped-on area can receive all or some of corresponding content from an initial local cache (that is, a local cache that initiates synchronization) located in an area on which the user terminal has camped (or located) before handover and provide the received all or some of corresponding content to the user terminal currently camping on the moved area by using synchronized information. The inventors have noted that the first method can provide all or some of content more rapidly than the second method in the area to which the user terminal has been handed over. While the second method can provide all or some of content more rapidly than the embodiment of providing all or some of content by an origin server, provision of content according to the second method may be slower than in the first method in view of a service speed related to providing content. However, in the second method, the cache synchronization system can operate cache resources more efficiently than in the first method because the second method synchronizes just a small amount of information such as content position information such that the cache synchronization system through can perform synchronization more rapidly than through the first method. Accordingly, it is possible for the cache synchronization system to appropriately select the first and second methods according to various communication environments and apply a selected method to synchronization. For example, cache synchronization can be performed through the second method in an area in which handover frequently occurs or at peak download time. Cache synchronization perform by the cache synchronization system can be carried out using the first method in an event where a user terminal is located in an area in which handover does not frequently occur or stays at a time (e.g., not busy hour in data traffic) other than the download peak time. Otherwise, cache synchronization perform by the cache synchronization system may not be applied in consideration of a load of a local cache. For example, when a synchronization policy according to the second method is applied, service coverage of a local cache extends into even a neighboring area, and thus load applied to the local cache may increase. In this case, cache synchronization may not be applied when synchronization according to the second method is performed by the cache synchronization system if a load of a specific local cache exceeds a predetermined reference value. Otherwise, if a load of a specific local cache exceeds a predetermined reference value when synchronization according to the second method is performed by the cache synchronization system, the second method may be switched to the first method to perform cache synchronization by the cache synchronization system. This can disperse the load of the specific local cache. That is, the cache synchronization system is configured to operate the cache synchronization policy in a selective or mixed manner in consideration of at least one of the load, time, handover occurrence frequency, and content popularity of a local cache.

Alternatively, when content synchronization is performed by the cache synchronization system only using the first method, a handover may occur when synchronization is not completed. In this case, transmission of content may be interrupted in the cache synchronization system. When content synchronization is carried out by the cache synchronization system only using the second method, delay or load increase may occur because data of corresponding content needs to be retrieved with reference to content information data. Meanwhile, the cache synchronization system in accordance with at least one embodiments of the present disclosure can prevent interruption due to handover before completion of synchronization in such a manner that the cache synchronization system performs synchronization through the second method and a synchronized local cache is configured to directly provide content upon completion of synchronizing the content through the first method.

In the following description, synchronization refers to any one or more of the first method, the second method and a hybrid method of the first and second methods.

In the cache synchronization according to at least one embodiment, a dispersion parameter may be set in order to manage a synchronization range. The dispersion parameter indicates a synchronization range of corresponding content and may be represented as the number of hops, for example. The dispersion parameter may be separately set for each content information data, each content information data group, each content, each content group, each local cache, each area, and each local cache group, whereas it may be alternatively set for all of one or more local caches. For example, if the dispersion parameter is set as to "2" for a specific video, it indicates that one or more neighboring local caches by 2 hops apart from apart from a currently served local cache can be synchronized. In this embodiment, synchronization is performed between or among neighboring local caches while subtracting (reducing, decreasing or deducting) the set value of the dispersion parameter by a predetermined unit value (e.g., 1) at every single time when content is synchronized (that is, whenever content is duplicated). And content synchronization perform by the cache synchronization system is stopped at a certain local cache at which the set value of the dispersion parameter reaches or falls below a first reference value (e.g. 0). In this manner of synchronization propagation, content can be transmitted up to a predetermined synchronization range. Here, the set value of dispersion parameter refers to the number of hops in accordance with at least one embodiment, and the dispersion parameter can indicate a predetermined geographical or logical distance.

The dispersion parameter can be set depending on an area or various attributes of content. The area may be an area allocated to each local cache: Firstly, when the dispersion parameter is set on the basis of the area, the dispersion parameter can be set in consideration of characteristics of the area. In this case, the dispersion parameter can be set to a predetermined value, e.g. a value greater than "1", in an area in which the number of occurrences of handover during content download exceeds a predetermined reference value. Furthermore, the dispersion parameter can be set to a predetermined value, e.g. a value larger than "1" for dispersing a load (e.g., traffic load, system load and so on) occurred in an area at which requests for content are congested. Secondly, when the dispersion parameter is set on the basis of various attributes of content, the dispersion parameter can be set on the basis of at least one of the type, size and preference value of content. For example, the dispersion parameter can be set to "3" for denominating a content type as a video, set to "2" for denominating the content type as an audio, and set to "1" for denominating the content type as a webpage. Furthermore, the dispersion parameter can be set to a predetermined value according to the size of content. For example, the dispersion parameter can be set to "3" at a certain event where the content size is greater than a predetermined first size and set to "1" at another certain event where the content size is smaller than the predetermined first size. The dispersion parameter may be set to "3" at still another certain event where preference value of content, e.g. the number of hits per predetermined time exceeds a predetermined reference value and set to "1" at further another certain event where the number of hits per predetermined time is smaller than the predetermined reference value. Setting the dispersion parameter depending on the area and various attributes of content is merely exemplary. Alternatively, the at least one embodiment of this disclosure may use any method of setting the dispersion parameter in such a manner that the dispersion parameter is set for each content information data, each content information group, each content, each content group, each local cache, each area, and each local cache group such that different content, different areas, different local caches, different content groups, or different cache groups can have different dispersion parameters.

Dispersion parameter setting information for setting the dispersion parameter according to the area or various attributes of content, as described above, is denominated as local dispersion parameter setting information, and the local dispersion parameter setting information may be included in the synchronization policy information whereby it is managed.

The dispersion parameter can be set for each local cache, each local cache group or all local caches. Information for setting the dispersion parameter for each local cache, each local cache group or all the local caches is called global dispersion parameter setting information and may be provided as default.

The reference and policy for setting the dispersion parameter are set as the synchronization policy information and distributed to a plurality of local caches. The local caches can be configured to set a dispersion parameter indicating a synchronization range with respect to at least one of data of content to be synchronized and content information data, on the basis of the synchronization policy information.

In addition, the cache synchronization in accordance with at least one embodiment of the present disclosure can be performed by the cache synchronization system in such a manner that it sets a specific synchronization propagation condition through the synchronization policy information and performs synchronization, when the synchronization propagation condition is satisfied, regardless of the value of the dispersion parameter.

For example, when the number of occurrences of handover to a specific area during content download exceeds a predetermined reference value, synchronization with the specific area is performed by the cache synchronization system even if the set value of the dispersion parameter is "0." In another embodiment with respect to a preference value of specific content, when the number of hits per predetermined time with respect to the specific content exceeds a predetermined reference value, that is, when the preference value of the specific content is high, synchronization can be performed by the cache synchronization system onto one or more neighboring local caches regardless of a synchronization range defined (or set, or indicated) by the dispersion parameter. Otherwise, the cache synchronization system is configured to perform synchronization between or among specific local caches irrespective of the value of the dispersion parameter by forcedly setting synchronization with a specific area (i.e., with a specific local cache in the area). Meanwhile, the above-mentioned three cases are exemplary and exceptional cases such that the dispersion parameter can be arbitrarily set in consideration with the operator' policy, communication environments and so on.

All the above-described cases can be set as the synchronization policy information, and thus each local cache performs synchronization on the basis of such synchronization policy information.

Configurations and operations of the cache controller 100 and the local cache 200 to perform the above-mentioned cache synchronization method will now be described with reference to FIGS. 2, 3 and 4.

Figure 2:
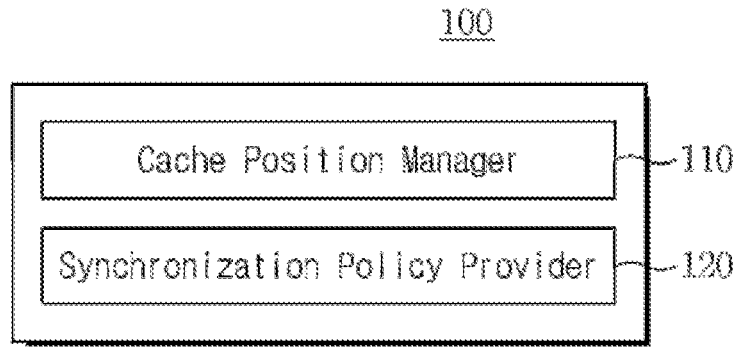
FIG. 2 is a block diagram of a cache controller in the cache synchronization system in accordance with at least one embodiment.

FIG. 2 is a block diagram of the cache controller 100 in the cache synchronization system in accordance with at least one embodiment. FIG. 3 is a block diagram of the local cache 200 in the cache synchronization system in accordance with at least one embodiment. FIG. 4 is a view of a cache synchronization process in accordance with at least one embodiment.

Referring to FIG. 2, the cache controller 100 is configured to include a cache position manager 110 and a synchronization policy provider 120.

The cache position manager 110 is configured to manage position information of the plurality of local caches 200 connected to the cache controller 100 through the communication network 300 and provide the position information to the one or more local caches 200. Each local cache 200 is configured to recognize presence and position (or address) of one or more neighboring local caches when synchronization is performed by managing the positions of the one or more local caches 200. The cache position manager 110 can acquire the position of the each local cache from the one or more local caches 200. The cache position manager 110 can share position information of at least one local cache with the plurality of local caches 200 by transmitting the position information to the one or more local caches 200. The local cache position information may be transmitted by the cache position manager 110 to each local cache in a unicast, multicast or broadcast manner or shared by the one or more local caches 200 one another by communicating among the one or more local caches 200. For example, neighboring local caches near a currently serving local cache is configured to share their owned position information by exchanging the owned position information. Each local cache is configured to transmit its position information to the cache position manager 110 for collecting the positions (i.e., position information) of the one or more local caches. Furthermore, the cache position manager 110 is configured to request each local cache to transmit its position information for collecting the positions of the one or more local caches. In this case, position information of a local cache may include at least one of the geographical position and logical position of the local cache. For example, the geographical or logical position of a local cache may be the geographical or logical position of an internet service provider (ISP) in which the local cache is located or the geographical or logical position of a base station relating to the local cache. The position information of the local cache may include address information (e.g. IP address) of the local cache.

The synchronization policy provider 120 is configured to set synchronization policy information that designates a synchronization range in various manners, as described above, and provide the set synchronization policy information to the one or more local caches 200. The synchronization policy provider 120 is configured to provide at least part of the synchronization policy information to the one or more local caches 200. In this case, the cache controller 100 can apply the synchronization policy information to each piece of distributed content when distributing content to the local caches. Upon reception of the content by a local cache, the local cache is configured to perform synchronization according to the synchronization policy information set to the corresponding content. For example, if a local cache requests content A, the cache controller 100 provides synchronization policy information applied to content A to the local cache. Specifically, a dispersion parameter corresponding to the content A is set according to the synchronization policy information, and the local cache 200 can perform synchronization associated with the content A according to the dispersion parameter upon receiving the content A and the dispersion parameter corresponding to the content A. The synchronization policy provider 120 is configured to update synchronization policy information such that the updated cache synchronization policy information is provided to the one or more local caches 200.

Figure 3:
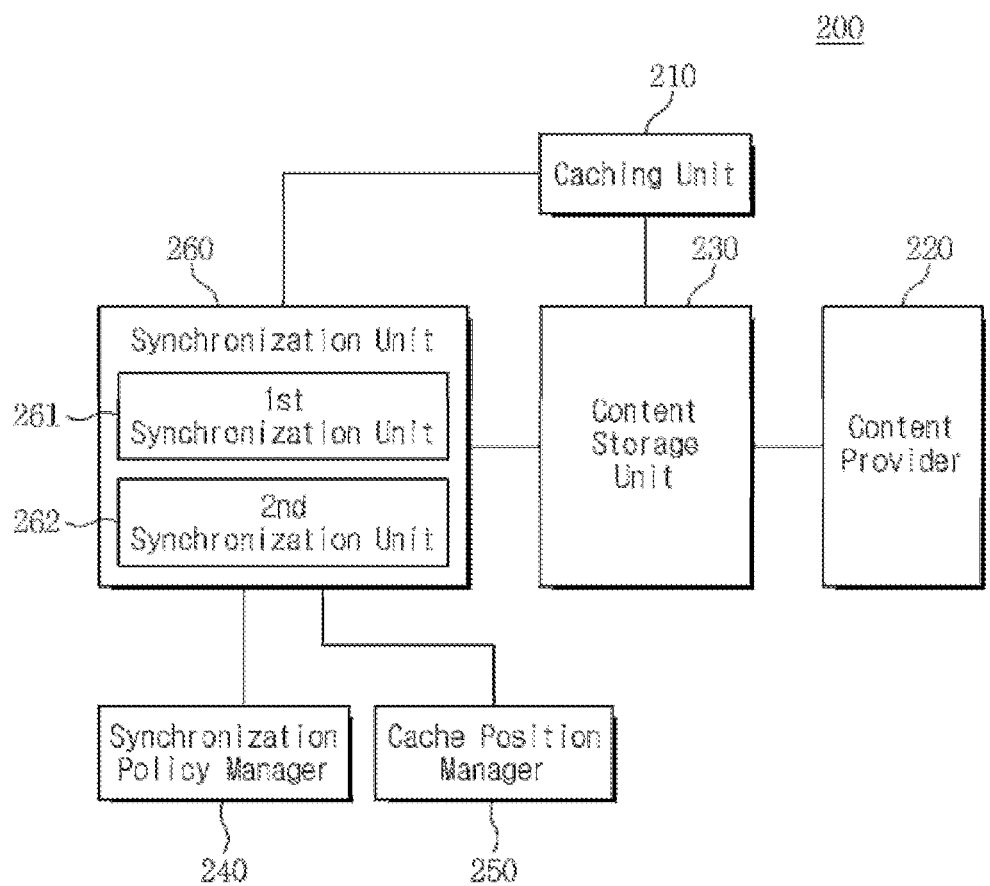
FIG. 3 is a block diagram of a local cache in the cache synchronization system in accordance with at least one embodiment.

Referring to FIG. 3, in the cache synchronization system in accordance with at least one embodiment, the local cache 200 is configured to include a caching unit 210, a content provider 220, a content storage unit 230, a synchronization policy manager 240, a cache position manager 250, and a synchronization unit 260. The synchronization unit 260 is configured to include a first synchronization unit 261 and a second synchronization unit 262. In some embodiments, the content storage unit 230 includes one or more computer-readable medium as described herein. The caching unit 210 and/or the content provider 220 include(s) one or more network interfaces including, but not limited to, cellular, Wi-Fi, LAN, WAN, CDMA, WCDMA, GSM, LTE and EPC networks, and cloud computing networks. Other components of the local cache 200, such as the synchronization policy manager 240, the cache position manager 250, and the synchronization unit 260, are implemented by one or more processors and/or application-specific integrated circuits (ASICs) as describe herein.

The caching unit 210 is configured to receive at least one content and its content information data from one of an origin server (not shown), another local cache and the cache controller 100, and store at least a part of the least one content or its content information data in the content storage unit 230. The caching unit 210 is configured to receive content according to a predetermined dispersion policy from an external device. If at least one content requested by a user terminal is not stored in the local cache 200, the caching unit 210 can request an external device such as the origin server to provide the at least one content and receive the at least one content.

The content provider 220 is configured to provide at least one content, stored in the content storage unit 230, to at least one user terminal located in an area (e.g. a communication area (or service coverage area) of a specific base station) in which the local cache 200 is located at the request of the at least one user terminal. If the content provider 220 dose not store the requested at least one content therein, the content provider 220 can receive the least one content from the origin server, another local cache or the cache controller 100 through the caching unit 210 and provide the received the least one content to the at least one user terminal.

The content storage unit 230 is configured to store at least one of content, content information data and synchronization policy information.

The synchronization policy manager 240 is configured to manage and upgrade the synchronization policy information. The synchronization policy information may be received from the cache controller 100, set as initial information, or stored in the content storage unit 230 according to at least one piece of synchronization policy information stored at an arbitrary time. The synchronization policy manager 240 can upgrade the synchronization policy information. The synchronization policy manager 240 is configured to receive upgraded synchronization policy information from the cache controller 100.

The cache position manager 250 is configured to manage geographical or logical position information of other local caches. The logical position of a local cache may be the number of hops from the local cache to another local cache. The cache position manager 250 can obtain position information of one or more local caches through communication with the one or more local caches. The cache position manager 250 is configured to acquire the position information of the one or more local caches from the cache position manager 110 of the cache controller 100. In this case, the cache position manager 250 is configured to broadcast or multicast a message that inquires about the position of a local cache and to determine the position of the local cache by analyzing a response to the inquired message to be received from the local cache.

The synchronization unit 260 is configured to set a synchronization range for content stored in the content storage unit 230 and performs synchronization of the content such that other local caches located in the set synchronization range can provide the content. The synchronization unit 260 can set the synchronization range for the content and confirm (or check, or detect) the other local caches located in the synchronization range on the basis of position information of the other local caches.

The synchronization unit 260 is configured to include the first synchronization unit 261 and the second synchronization unit 262. Functions of the first and second synchronization units 261 and 262 are discriminated from each other for convenience of description.

The first synchronization unit 261 is configured to perform synchronization when content is initially cached, that is, the content is initially received from the origin server or the cache controller 100 and stored. That is, the first synchronization unit 261 is configured to initiate synchronization when content is cached in the local cache 200. Content caching can be generated by the first synchronization unit 261 when the local cache 200 requests the origin server or the cache controller 100 to provide content requested by a terminal since the content is not stored, or when content is distributed according to a predetermined dispersion policy as in a CDN.

That is, the first synchronization unit 261 is configured to perform synchronization at a certain event where content transmitted through synchronization performed by another local cache is not received, and to set a synchronization range of the content on the basis of previously stored synchronization policy information. The synchronization range can be set using the above-described dispersion parameter. The first synchronization unit 261 is configured to transmit to one or more neighboring local caches synchronization information including one of the content and the content information data along with the dispersion parameter to thereby perform synchronization. When the first synchronization unit 261 receives content, the first synchronization unit 261 is configured to determine whether local dispersion parameter setting information relating to the received content is present. The local dispersion parameter setting information can be predetermined by the cache controller 100 and transmitted. The first synchronization unit 261 is configured to set a dispersion parameter for the received content using the local dispersion parameter setting information upon determining that the local dispersion parameter setting information is present. If it is determined that the local dispersion parameter setting information is not present, the first synchronization unit 261 is configured to determine whether global dispersion parameter setting information relating to the received content is present. When the global dispersion parameter setting information is not present, the first synchronization unit 261 may not perform synchronization. When the global dispersion parameter setting unit is otherwise present, the first synchronization unit 261 is configured to set the dispersion parameter for the received content on the basis of (or referring to) the global dispersion parameter setting information.

Upon reception of at least one of content and content information data through synchronization with another local cache (hereinafter referred to as a second local cache for convenience), the second synchronization unit 262 is configured to perform synchronization propagation to transmit the received content or content information data to another local cache (hereinafter referred to as a third local cache). The received content and content information data can be stored in the content storage unit 230 and used when the received content is provided to at least one user terminal. That is, when the second synchronization unit 262 is configured to receive at least one of content and content information data from the second local cache or the cache controller 100, if the received at least one of the content and content information data includes a dispersion parameter set for the at least one of the content and content information data, the second synchronization unit 262 transmits the at least one of the content and content information data to the third local cache on the basis of the dispersion parameter. Namely, the second synchronization unit 262 is configured to send (or deliver, or transmit, or forward) the at least one of the content and content information data to the third local cache depending on a synchronization range set by the second local cache or the cache controller 100. Specifically, the second synchronization unit 262 is configured to progressively reduce (or decrease, subtract, or deduct) the value of the dispersion parameter included in the received content or content information data by a predetermined unit value (e.g. '1'). The second synchronization unit 262 is configured to determine whether a reduced dispersion parameter is smaller than a predetermined first reference value (e.g. '0'). When the reduced dispersion parameter is not smaller than the first reference value, the second synchronization unit 262 is configured to perform synchronization with at least one neighboring local cache for the received content or content information data. Here, "neighboring" or "adjacent" may mean that the logical distance between neighboring (or adjacent) local caches corresponds to one hop. Furthermore, "neighboring" or "adjacent" may mean that service areas (or service coverage areas) of neighboring (or adjacent) local caches partially overlap. When one or more local caches provide services to one or more wireless terminals, "neighboring" or "adjacent" may mean that the coverages of the neighboring (or adjacent) local caches partially overlap. Here, a "coverage" may mean that the coverage of a base station or a coverage of a digital unit (DU) toll center. When the reduced dispersion parameter is smaller than the first reference value (e.g. '0'), synchronization for the content has been completed, and thus the second synchronization unit 262 does not perform synchronization propagation. In this case, the second synchronization unit 262 is configured to re-determine whether to perform synchronization for the received content on the basis of the synchronization policy information and to perform synchronization for the received content again on the basis of the synchronization policy information.

Figure 4:
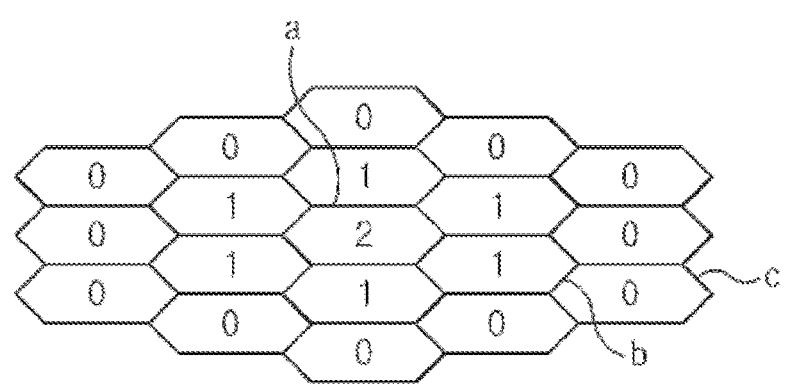
FIG. 4 is a schematic view of neighboring local caches in a cache synchronization process in accordance with at least one embodiment.

FIG. 4 is a schematic view of neighboring local caches in a cache synchronization process in accordance with at least one embodiment. In FIG. 4, when it is assumed that content is cached in a local cache located in area (or service area, or cell) 'a' and the value of a dispersion parameter for the cached content is set to '2', the value of the dispersion parameter is reduced by '1' to thusly become '1' when synchronization is performed for a neighboring local cache 'b' located at a distance corresponding to one hop from the local cache 'a'. When the local cache 'b' performs synchronization for a local cache 'c' located at a distance corresponding to one hop from the local cache 'b', the local cache 'c' reduces the dispersion parameter by '1', and thus the value of the dispersion parameter finally becomes '0'. Accordingly, synchronization is performed up to the local cache 'c' for the content cached in the local cache 'a'.

Figure 5:
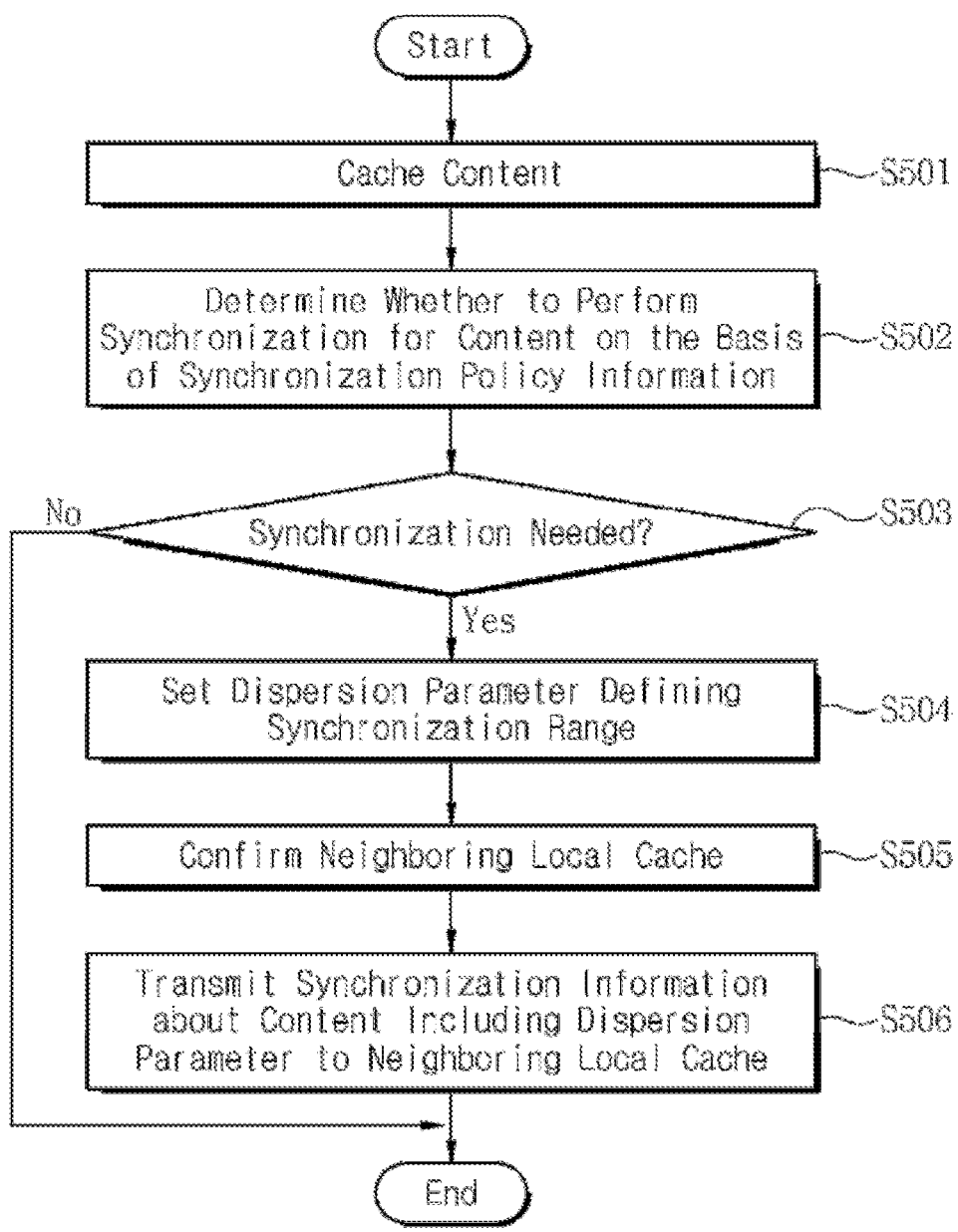
FIG. 5 is a flowchart of a cache synchronization process of a local cache that attempts to synchronize content stored therein with another local cache in accordance with at least one embodiment.

A description will be given of a cache synchronization method in accordance with at least one embodiment. FIG. 5 is a flowchart of a process through which a local cache that caches content synchronizes the cached content with at least one neighboring local cache.

Referring to FIG. 5, when specific content is cached in a local cache 200 (S501), the local cache 200 is configured to determine whether to perform synchronization for the content on the basis of previously stored synchronization policy information (S502).

Here, caching content means that content for which a dispersion parameter is not set is received from the origin server, the cache controller 100 or another local cache, and stored in the content storage unit 230. Meanwhile, synchronization is performed only when content is cached in the at least one embodiment, and the time when synchronization is performed can be varied as necessary. For example, the local cache 200 performs synchronization when the local cache 200 provides content at the request of a user terminal for the content. Caching content may occur when the local cache 200 does not store content requested by a user terminal or when content dispersion is performed according to a predetermined dispersion policy.

The local cache 200 performs determination of whether to perform synchronization by considering at least one of items (or factors) such as preference value, size and type of content, the occurrence frequency of handover during provision of the content, a direction in which handover is occurred (or generated), and whether to forcedly set synchronization is set between local caches, and by determining whether such items (or factors) satisfy conditions set in the synchronization policy information. That is, if the above-described items (or factors) satisfy at least one of such items necessary for synchronization, the local cache 200 determines that synchronization is to be performed.

When the local cache 200 determines that synchronization is to be performed, the local cache 200 is configured to define a synchronization range for the content on the basis of the previously stored synchronization policy information (S504). The synchronization range can be defined by setting a dispersion parameter.

In step S504, the local cache 200 determines whether the synchronization policy information includes local dispersion parameter setting information relating to the content and, when the synchronization policy information includes the local dispersion parameter setting information relating to the content, sets the dispersion parameter for the content using the local dispersion parameter setting information. When the synchronization policy information does not include the local dispersion parameter setting information relating to the content, the local cache 200 can set the dispersion parameter according to global dispersion parameter setting information relating to the content. For example, the dispersion parameter can be set by the number of hops between local caches.

Upon setting of the dispersion parameter for the content, the local cache 200 is configured to check (or confirm, or determine) one neighboring local cache, closely adjacent to the currently serving local cache, among neighboring local caches managed by the cache position manager 250 by using position information of the neighboring local caches (S505).

The local cache 200 performs synchronization for the checked neighboring local cache (S506). For this, the local cache 200 is configured to store the IP address of the checked neighboring local cache and transmit at least one of the content and content information data and the set dispersion parameter to the checked neighboring local cache.

As described above, the content or content information data transmitted with the dispersion parameter is stored in the checked neighboring local cache such that the content or content information data can be provided during handover of at least one user terminal.

The checked neighboring local cache performs synchronization of the received content or content information data for another local cache according to the received dispersion parameter, which is described with reference to FIG. 6.

Figure 6:
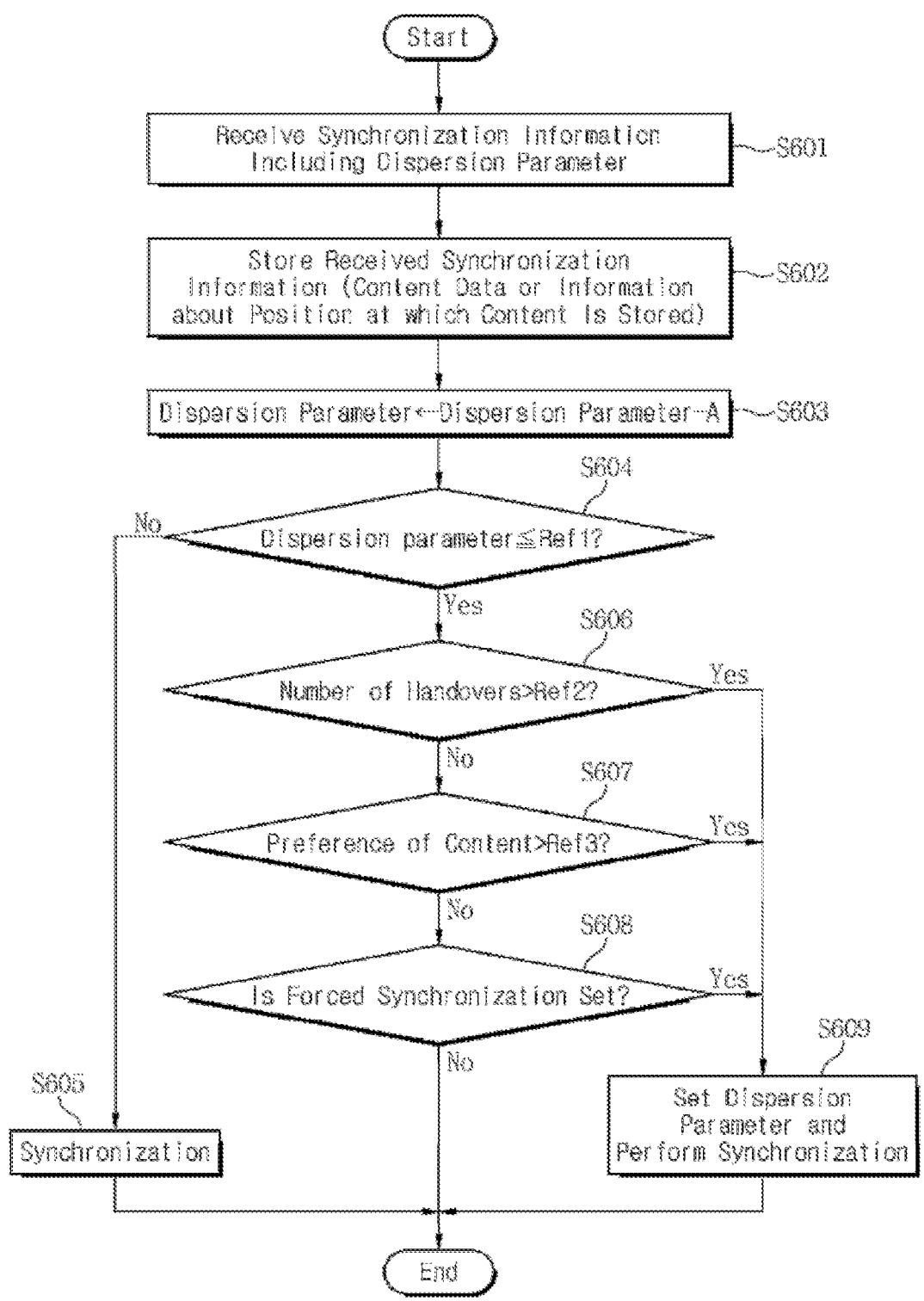
FIG. 6 is a flowchart of a cache synchronization process of a local cache that receives a synchronization request from another local cache in accordance with at least one embodiment.

FIG. 6 is a flowchart of a cache synchronization process performed by a local cache that has received content or content information data according to synchronization, such as the above-described neighboring local cache.

The following process is performed by a local cache 200 that has received content or content information data, which includes a dispersion parameter for synchronization, from another local cache or the cache controller 100.

Referring to FIG. 6, the local cache 200 can receive content or content information data for which a dispersion parameter for synchronization is set from another local cache or the cache controller 100 (S601).

The received content or content information data is stored in the content storage unit 230 of the local cache 200 (S602). The stored content or content information data is used to provide content to a user terminal that requests the content later.

The local cache 200 is configured to determine whether to perform synchronization propagation for transmitting the received content or content information data to another local cache.

Specifically, the local cache 200 reduces (or decreases, or subtracts, or deducts) the value of the dispersion parameter received with the content and content information data by a predetermined unit value A (for example, A can be set to be '1' as a predetermined unit value) (S603). Reducing the value of the dispersion parameter means that synchronization is performed by a local cache once within a predetermined synchronization range. For example, if A is set to be '1' as a predetermined unit value, synchronization with another neighboring local cache will be performed by the local cache 200 just once because the value of the dispersion parameter will be reduced to finally be '0.'

The local cache 200 determines whether the value of the reduced dispersion parameter is smaller than a predetermined first reference value Ref 1 (e.g. '0') (S604). Here, the dispersion parameter represents a synchronization range, as described above. If the value of the dispersion parameter is smaller than the first reference value, the local cache 200 does not perform synchronization with another neighboring local cache any more (unless one or more conditions exemplarily described with respect to S606-S608 is/are met). If the value of the dispersion parameter is not smaller than the first reference value (i.e., Ref 1=0), synchronization with another local cache is performed by the local cache 200.

Accordingly, when the value of the reduced dispersion parameter is not smaller than the first reference value, Ref 1, the local cache 200 performs synchronization by transmitting the received content or content information data to another neighboring local cache. Here, the local cache 200 transmits the reduced dispersion parameter with the content or content information data (S605).

If the value of the reduced dispersion parameter is smaller than the first reference value (i.e., Ref 1) in step S604, the local cache 200 does not perform synchronization with another local cache for the content any more.

However, even if the value of the dispersion parameter set for the content is smaller than the first reference value (i.e., Ref 1) (i.e., in case where synchronization for the content has been performed by the local cache 200 as many times as the synchronization range initially set by the local cache 200 at a time when the local cache 200 has initially cached the content), additional synchronization for the content can be performed by the local cache 200. For example, it may be more efficient to synchronize all content of the local cache 200 with a neighboring local cache because handover is frequently occurred in the local cache 200, or it may be more efficient to store content in all local caches because a preference value of the content is very high. Otherwise, synchronization is forcedly set such that synchronization is performed between the local cache 200 and a neighboring local cache as necessary. These conditions about synchronization forcedly set may be configured to be included in the synchronization policy information.

Accordingly, the local cache 200 is configured to check the previously stored synchronization policy information to determine whether synchronization of the content is forcedly performed irrespective of the value of the dispersion parameter even though the value of the dispersion parameter is smaller than the first reference value.

For example, the local cache 200 determines whether the number of handover occurrences of a terminal exceeds a predetermined second reference value Ref2, whether preference value of content is higher than a predetermined third reference value Ref3 and whether another local cache for which forced synchronization is set is present during provision of the content to the terminal (S606, S607 and S608).

If any of the above conditions (i.e., in steps S606, S607 and S608) is satisfied, in response to one or more of the above conditions the local cache 200 sets a dispersion parameter according to setting information corresponding to the satisfied condition and transmits the set dispersion parameter with the content or content information data to at least one neighboring local cache to thereby perform synchronization for the content (S609). The dispersion parameter can be set to a value different from the value set before the time when content is cached in FIG. 5. For example, the local cache 200 can perform synchronization just once with another neighboring local cache by setting the value of the dispersion parameter to '1' in step S609.

As fully discussed above, when local caches are dispersed and distributed in different areas, particularly, for respective wireless access networks in a mobile network including a plurality of wireless access networks such that the local caches provide content to one or more user terminals connected to the wireless access networks, the at least one embodiment of this disclosure achieves cache synchronization between adjacent local caches by transmitting content provided by a specific local cache to at least one neighboring local cache having possibility of handover. Accordingly, the at least one embodiment can be applied to a content transmission field, for example, particularly, to a content distribution network (CDN) field to provide high QoS to users.

In addition, when content is provided to at least one user terminal that is connected to a wireless access network and occurs (or generates) handover according to the user terminal's movement to or from an area served by another local cache (or cell), content can be seamlessly provided to the user terminal through a neighboring local cache even when handover occurs since the user terminal moves. Moreover, the various embodiments can minimize resource loss of local caches through an appropriate cache synchronization policy when performing synchronization between local caches. Particularly, the various embodiments can perform cache synchronization more efficiently by considering positions of local caches, attributes of content, the occurrence frequency of handover, a preference value of content, etc.

The various embodiments as described above may be implemented in the form of one or more program commands that can be read and executed by a variety of computer systems and be recorded in any non-transitory, a computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as a floptical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement the present invention or vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

While various embodiments have been particularly shown and described, it will be understood by those skilled in the art that various changes in form and details may be made therein without departing from the subject matter and scope of this disclosure. Specific terms used in this disclosure and drawings are used for illustrative purposes and not to be considered as limitations of the present disclosure.

What is claimed is:

1. A local cache, comprising:
   a content storage unit configured to store at least a part of at least one content;
   a cache position manager configured to manage position information of one or more local caches; and
   a synchronization unit configured to set a synchronization range for the at least one content, and to perform synchronization of the at least one content such that the at least one content is made available at another local cache located in the set synchronization range on the basis of the position information of the one or more local caches.

2. The local cache of claim 1, wherein the synchronization unit is configured to perform synchronization when the at least one content is initially cached in the content storage unit.

3. The local cache of claim 1, further comprising:
   a synchronization policy manager configured to manage synchronization policy information used as a reference by which the synchronization range is set,
   wherein the synchronization unit is configured to set the synchronization range on the basis of the synchronization policy information and the position information of the one or more local caches.

4. The local cache of claim 3, wherein the synchronization policy manager is configured to set the synchronization policy information on the basis of at least one of preference value, size and type of content, occurrence frequency of handover during provision of content by the local cache, a handover occurrence direction, and whether synchronization is forcedly set between local caches.

5. The local cache of claim 1, wherein the synchronization unit is configured to perform synchronization by transmitting, to the another local cache, synchronization information including at least one of the at least content to be synchronized and content information data including information about a position at which the content is stored.

6. The local cache of claim 5, wherein the synchronization unit is configured to set a dispersion parameter indicating the synchronization range, and to transmit the synchronization information including the dispersion parameter to the another local cache.

7. The local cache of claim 6, wherein the synchronization unit is configured to set the dispersion parameter such that the dispersion parameter indicates the number of hops through which the synchronization information is transmitted, and is progressively reduced by a predetermined unit value according to synchronization propagation between local caches.

8. The local cache of claim 5, wherein upon reception of synchronization information including a dispersion parameter corresponding to a synchronization range from other local cache, the synchronization unit is configured to reduce the value of the dispersion parameter by a predetermined unit value, and to transmit the synchronization information including the reduced dispersion parameter to the another local cache if the synchronization unit determines that the value of the reduced dispersion parameter is greater than a first reference value.

9. The local cache of claim 8, wherein even if the reduced dispersion parameter is smaller than the first reference value, the synchronization unit is configured to set the dispersion parameter, and to transmit to the another local cache the set dispersion parameter with the synchronization information in response to one or more of
- when the number of handover occurrences exceeds a second reference value,
- when a preference value of the at least one content to be synchronized exceeds a third reference value, and
- when synchronization is forcedly set for the another local cache.

10. The local cache of claim 1, further comprising:
- a caching unit configured to receive the at least one content and content information data from one of an origin server, another local cache and a cache controller, and store the received at least one content in the content storage unit; and
- a content provider configured to provide the at least one content, stored in the content storage unit, to at least one user terminal.

11. The local cache of claim 1, wherein the synchronization unit further comprises:
- a first synchronization unit configured to perform synchronization when the at least one content is initially cached; and
- a second synchronization unit configured to perform synchronization propagation to transmit the content or content information data received from one local cache to another local cache.

12. A cache synchronization method performed by a local cache among a plurality of local caches to provide at least one content to one or more user terminals located in the corresponding areas, the cache synchronization method comprising:
- determining whether to perform synchronization for specific content on the basis of synchronization policy information;
- if it is determined that synchronization is performed, setting a dispersion parameter that defines a synchronization range for the specific content according to the synchronization policy information; and
- transmitting synchronization information about the specific content, which includes the dispersion parameter, to a neighboring local cache.

13. The cache synchronization method of claim 12, further comprising:
- before the transmitting of the synchronization information, confirming the neighboring local cache on the basis of position information of the other local caches.

14. A cache synchronization method performed by a local cache among a plurality of local caches to provide content to at least user terminal located in the corresponding areas, comprising:
- receiving synchronization information about specific content, which includes a dispersion parameter that defines a synchronization range, from another local cache;
- storing the received synchronization information such that the specific content is provided to the at least one user terminal;
- reducing the value of the dispersion parameter by a predetermined unit value, comparing the value of the reduced dispersion parameter with a first reference value, and determining whether synchronization is performed according to the comparison result; and
- transmitting synchronization information including the reduced dispersion parameter to a neighboring local cache.

15. The cache synchronization method of claim 14, further comprising:
- confirming predetermined synchronization policy information upon determining that synchronization is not to be performed;
- determining whether synchronization is performed according to the predetermined synchronization policy information; and
- setting the dispersion parameter that defines the synchronization range upon determining that synchronization is to be performed and transmitting the dispersion parameter with the synchronization information to the neighboring local cache.

16. The cache synchronization method of claim 15, wherein the determining comprises
- determining that synchronization is to be performed in response of one or more of when the number of handover occurrences exceeds a second reference value, when a preference value of the content exceeds a third reference value, and when synchronization is forcedly set for other local cache.

* * * * *